US005668451A

United States Patent [19]
Driendl et al.

[11] Patent Number: 5,668,451
[45] Date of Patent: Sep. 16, 1997

[54] METHOD FOR MONITORING THE OPENING AND CLOSING PROCESS IN A SYSTEM HAVING AT LEAST ONE COMPONENT MOVED BY ELECTRIC MOTOR

[75] Inventors: Dieter Driendl, Deggenhausertal; Wolfgang Schulter, Meersburg; Ulrich Joos, Nonnenhorn; Manfred Fischer, Oberteuringen, all of Germany

[73] Assignee: Temic Telefunken microelectronic GmbH, Heilbronn, Germany

[21] Appl. No.: 561,199

[22] Filed: Nov. 22, 1995

[30] Foreign Application Priority Data

Nov. 26, 1994 [DE] Germany .................. 44 42 171.0

[51] Int. Cl.$^6$ .................................................. H02F 3/00
[52] U.S. Cl. ........................................ 318/466; 361/28
[58] Field of Search ................................ 318/280–286, 318/466–471, 474; 49/25, 26, 28, 118; 160/291, 292, 293.1; 307/9.1, 10.1; 361/23, 28

[56] References Cited

U.S. PATENT DOCUMENTS

| | | | |
|---|---|---|---|
| 4,393,342 | 7/1983 | Matsuoka et al. | 318/467 |
| 4,409,529 | 10/1983 | Basford et al. | 318/376 X |
| 4,496,942 | 1/1985 | Matsuoka | 49/25 X |
| 5,069,000 | 12/1991 | Zuckerman | 49/28 |
| 5,415,055 | 5/1995 | Henfrey | 49/49 X |

FOREIGN PATENT DOCUMENTS

| | | |
|---|---|---|
| 0479045A2 | 9/1991 | European Pat. Off. . |
| 3034118C2 | 12/1983 | Germany . |
| 3346366C2 | 12/1985 | Germany . |
| 3514223C2 | 3/1987 | Germany . |
| 3539265AZ1 | 5/1987 | Germany . |
| 3136746C2 | 4/1988 | Germany . |
| 3532078C2 | 5/1988 | Germany . |
| 2926938C2 | 1/1990 | Germany . |
| 9011262.8 | 11/1990 | Germany . |
| 9100504.3 | 5/1991 | Germany . |
| 4000730A1 | 8/1991 | Germany . |
| 4127047A1 | 2/1993 | Germany . |
| 9217563.5 | 5/1993 | Germany . |
| 4214998A1 | 11/1993 | Germany . |
| 3335407C3 | 12/1993 | Germany . |
| 4234501A1 | 4/1994 | Germany . |
| 4410506A1 | 10/1994 | Germany . |

Primary Examiner—Jonathan Wysocki
Attorney, Agent, or Firm—Spencer & Frank

[57] ABSTRACT

A method for monitoring the opening and closing process in a system having at least one component moved by electric motor is described. During this process, the following process steps are provided:

- during the movement of the components, all operating parameters of the motor are captured continuously at time-equidistant measuring moments,
- the energy balance developing during the movement is formed with the aid of the captured operating parameters of the motor,
- the total force resulting from the movement is determined from the energy balance and the design parameters of motor and gear,
- the trapping force is determined from the total force at each measuring moment with the aid of a time window whose window width is selected as time difference between the respective measuring moment and a respective reference moment such that, at least at one reference moment, a trapping force does not yet occur,
- the course of the trapping force as a function of time is evaluated and a trapping situation is detected when predetermined limit values or threshold values are exceeded,
- specific reactions are initiated when a trapping situation is recognized.

5 Claims, 1 Drawing Sheet

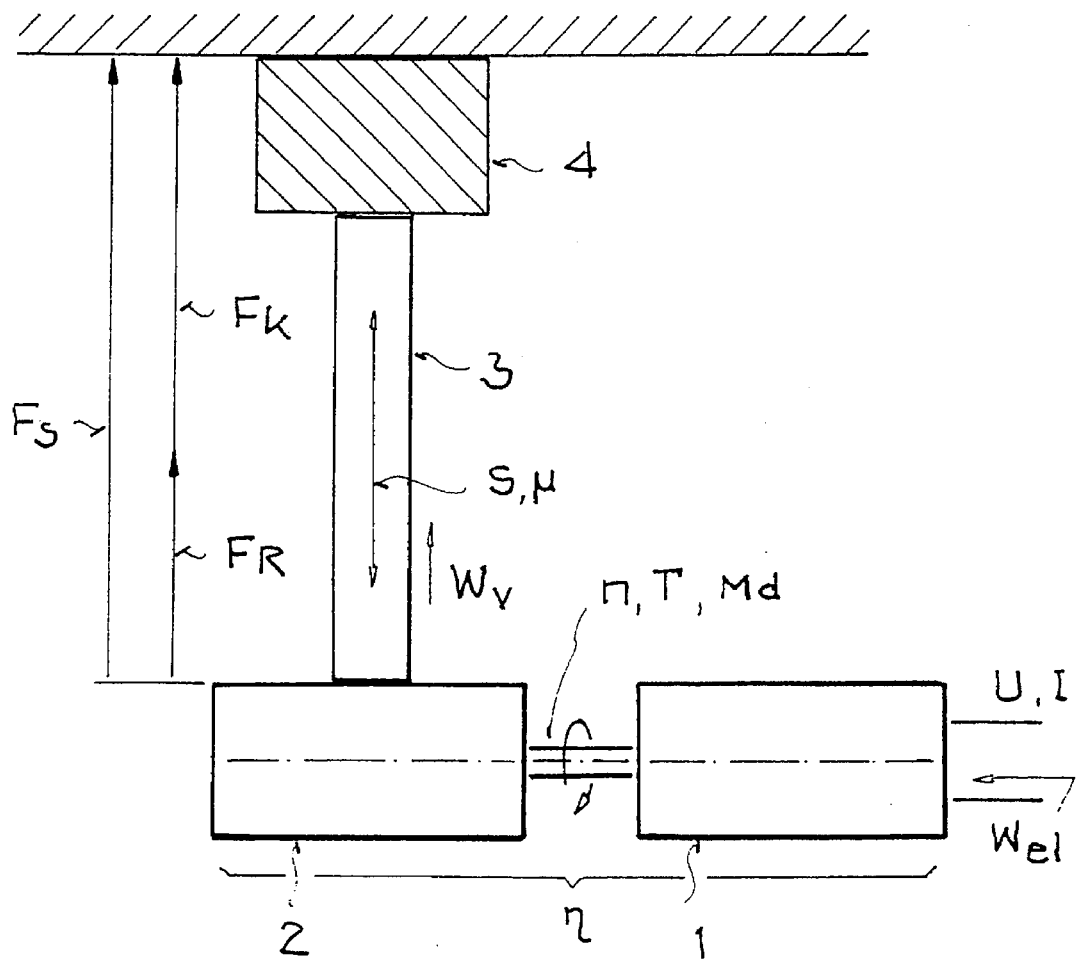
FIG.

METHOD FOR MONITORING THE OPENING AND CLOSING PROCESS IN A SYSTEM HAVING AT LEAST ONE COMPONENT MOVED BY ELECTRIC MOTOR

Mechanical systems having components which are moved by electric motor are employed in a variety of applications—in motor vehicles, for example, such systems are frequently used to implement the closing functions of side windows and sliding roof. Particularly in automatically progressing closing processes, however, there exists a trapping risk with respect to the trapping of body parts or objects; for safety reasons, a protection against trapping should therefore be provided, as is already prescribed by decree for certain types of applications.

The monitoring of the opening/closing process to ensure the provision of such a protection against trapping can take place, for example, by means of optical detectors for detecting possible obstacles or by determining and evaluating the trapping force or the course of the trapping force as a function of time developing during the trapping process. Since the direct determination of the trapping force (for example, by means of force sensors or torque sensors) is rather costly due to the sensors that are required, most monitoring methods determine the trapping force or its course as a function of time indirectly by capturing a characteristic motor quantity or a motor parameter (for example, the motor rpm) as measured quantity, evaluate this quantity by comparing it with a reference measurement or with reference measurements and initiate a specific reaction (for example, a reversal of the motor drive or switching off the motor current) when certain limit values/threshold values are exceeded.

A drawback of these methods is the frequently insufficient monitoring of the opening/closing process and the associated insufficient protection against trapping because there is only a tendential relationship between the captured measured quantity and the force-like quantity derived from it so that considerable inaccuracies occur during the determination of the real trapping force, manufacturing tolerances, aging effects, environmental influences (temperature, humidity, etc.) have a very considerable effect on the evaluation (comparison with the reference measurement taken under different conditions), because of the location orientation or dependence on location (measurement and evaluation take place while being rigidly dependent on the motor position, i.e. in equidistant steps with respect to the motor revolution), the response time is often too long when critical trapping situations occur (the resolution of time is reduced as a result of the reduction of the rpm of the motor which is associated with trapping).

It is the object of the invention to specify a method in accordance with the preamble of patent claim 1, which method ensures an effective protection against trapping under all ambient conditions or operating conditions.

This object is solved according to the invention by the features comprised in the characteristic part of patent claim 1. Advantageous modifications and developments of the method ensue from the dependent claims.

In the method presented here, the trapping force is derived from the operating state of the motor while taking all motor parameters into account: the required closing energy is determined in accordance with the law of conservation of energy from the electrical energy supplied to the motor (this energy is dependent on the supply voltage, the motor current and the drive efficiency), the forces which occur (trapping force and frictional force) are determined from the closing energy while taking account of the characteristic motor quantities (motor rpm or motor period duration and transmission ratio), a trapping situation is detected by evaluating the course of the frictional force or the trapping force as a function of time (for example, by means of comparison with a constant threshold value or by evaluating the time profile), and the closing energy is reduced by switching off or reversing the motor drive when predetermined limit values are exceeded or reached. By way of a time-oriented procedure—sampling of the input quantities at the measuring moments and evaluation (the determination of the instantaneously acting trapping force) take place in equidistant time steps with a predeterminable step size (for example, the measuring moments follow one another at intervals of one millisecond)—it is possible to execute a continuous determination of the trapping force with a very high resolution of time. For determining the trapping force and for evaluating the course of the force as a function of time, a time window with a predeterminable window width is used, which width corresponds to the time difference between the actual measuring moment and a reference moment. The window width is selected such that out of the possible trapping events the one which occurs at the slowest speed can still be detected reliably: for this purpose, at least one reference moment is set to coincide with a moment at which a trapping force does not yet occur and, from this, the frictional force is determined. During the evaluation, the time window serves to form a weighted mean value from the measured values and the characteristic motor quantities of the actual measuring moment and the reference moment. The drive efficiency is preferably adapted continuously to the supply voltage and the operating temperature during the closing movement, thereby eliminating the dependence of the drive efficiency on the external conditions.

The method presented here combines several advantages:

since the trapping force determined for the assessment of a trapping situation is determined by evaluating all of the physically relevant operating parameters of the motor (efficiency, current, voltage, armature rpm or armature period) and thus in the precise physical dimension, it represents a direct reflection of the actually acting trapping force; a trapping process can therefore be detected very reliably and accurately under all operating conditions, because of the time-oriented procedure, a continuous determination of the trapping force is possible with a very high resolution of time; this has an advantageous effect, particularly during abrupt trapping processes involving trapped bodies having a high rigidity, because here the slope steepness of the force increase assumes very high values—thus, trapping processes which progress with great speed can also be detected reliably and appropriate countermeasures can be taken, the trapping situation does not depend in any way on external marginal conditions; therefore, trapping detection can also take place reliably even if there is a variation of ambient conditions, supply voltage, rigidity of the trapped body or of the drive, frictional conditions in the drive and production variations of the drive characteristic, reproducible trapping force limit values or minimum force limits with little variation are given even for trapped bodies of different rigidity or in gear-mechanical arrangements having different degrees of stiffness.

The FIGURE is a block diagram of the motor controller of the instant invention.

The presented method will now be explained in greater detail by way of an exemplary embodiment.

According to the FIGURE, the electrical work $W_{el}$ supplied to the motor 1 is converted into advancing work $W_v$ for component 3 which is moved translationally and, additionally, into deformation work when the trapped body 4 (in the event of a trapping) is reached. While taking account of the overall efficiency $\eta$ of motor 1 and gear 2, the following results from the law of conservation of energy:

$$W_v = \eta \cdot W_{el} \qquad (1).$$

The electrical work $W_{el}$ supplied to the motor is defined as follows:

$$W_{el} = U \cdot I \cdot t \qquad (2),$$

where U is the operating voltage, I the motor current and t the time duration.

By neglecting the moved masses, one obtains for the advance work $W_v$, or, in the event of a trapping, for the resulting deformation work:

$$W_v = F_s \cdot s \qquad (3),$$

where $F_s$ is the total force and s the path traversed by the moved component 3.

If trapping occurs, the total force or summation force $F_s$ generated by the motor drive is made up of the trapping force $F_K$ and the frictional force $F_R$:

$$F_s = F_K + F_R \qquad (4).$$

Thus, the following relationship follows for the trapping force $F_k$:

$$F_K = F_S - F_R = \frac{W_V}{s} - F_R = \eta \cdot \frac{W_{el}}{s} - F_R = \eta \cdot \frac{U \cdot I \cdot t}{s} - F_R. \qquad (5)$$

For the given translational transmission ratio $\ddot{U}$ of the drive, the path s traversed by component 3 can be determined from the armature rpm n of the motor 1 or the armature period T of motor 1 and the time duration t:

$$s = \ddot{U} \cdot n \cdot t \text{ or } s = \ddot{U} \cdot \frac{t}{T}. \qquad (6)$$

Thus, from equation (5) the following results for the trapping force $F_k$:

$$F_K = \eta \cdot \frac{U \cdot I \cdot T}{U} - F_R \qquad (7)$$

or for the time dependence of the trapping force $F_K(t)$:

$$F_K(t) = \eta(U) \frac{U(t) \cdot I(t) \cdot T(t)}{U} - F_R(t). \qquad (8)$$

By way of this equation, the course of the clamping force $F_k(t)$ as a function of time is determined: operating voltage U, motor current I and period duration T of the armature revolution can be detected easily and in a cost-efficient manner in terms of measuring technique, the translational transmission ratio $\ddot{U}$ is predetermined by the design and changes only slightly under the action of a force if the construction of the drive is sufficiently sturdy. The degree of efficiency $\eta$ represents a motor-specific or gear-specific quantity which depends on the supply voltage U; the voltage dependence of the degree of efficiency is taken into account by way of the motor characteristic, and the temperature dependence of the degree of efficiency can be eliminated by capturing the temperature. The frictional force $F_R$, which occurs in the translationally moved component 3 and is subject to extreme fluctuations as a result of changes of the coefficient of friction μ due to influences of temperature, contamination and aging and which also varies as a function of the structural design of the drive bearing and guidance, is determined by at least one reference measurement from the operating state of the motor 1 provided that a trapping situation has not occurred (i.e. this reference measurement must take place at a reference moment $t_R$ at which the trapping force is $F_K=0$).

In this case, the following relationship ($F_K(t_R)=0$) results from equation (8) for the reference moment $t_R$:

$$F_R(t_R) = \eta(U) \cdot \frac{U(t_R) \cdot I(t_R) \cdot T(t_R)}{U}. \qquad (9)$$

At the measuring moment $t_M$, at which a trapping may occur, the relevant trapping force $F_K(t_M)$ can thus be determined from the equations (8) and (9) by forming a difference:

$$F_K(t_M) = \eta(U) \cdot \frac{U(t_M) \cdot I(t_M) \cdot T(t_M)}{U} - \eta(U) \cdot \frac{U(t_R) \cdot I(t_R) \cdot T(t_R)}{U}. \qquad (10)$$

The indices M and R describe the sampling moments for the measuring process, with the index M specifying the actual moment and the index R the moment of a preceding reference sampling, i.e. M>R. By way of the difference $t_M-t_R$, a discrete time window is therefore defined as time difference between the actual measuring moment $t_M$ and the reference moment $t_R$, whose width is selected on the basis of the slowest trapping event that can still be detected; the selection of the parameter R ensures that at least one reference measurement takes place at a moment during which the trapping force is $F_K=0$.

The change of the motor torque $M_d$ resulting from a the trapping process has an immediate effect on the motor current I, while, in comparison, because of the high mass inertia the motor rpm n or the armature period T and also the supply voltage U only change slowly. The equation (10) can therefore be simplified as follows:

$$F_K(t_M) = \eta(U) \cdot [I(t_M) - I(t_R)] \frac{U(t_M) \cdot T(t_M)}{U}. \qquad (11)$$

The determination of the trapping force $F_K$ takes place time-equidistantly and synchronously to the detection of the respective measured quantities. According to equation (10), the values of the reference moment $t_R$ are taken into account during this process for all parameters or measured quantities; in the simplified equation (11), the value at the reference moment $t_R$ is also used but only for the motor current I, while for all other parameters, only the actual values at the respective measuring moment $t_M$ are operative. For the storage of the measured quantities or parameters that are required for determining the trapping force $F_K$, a floating buffer memory having a storage depth of the order of magnitude of the difference $t_M-t_R$ may be provided.

In order to be able to reliably detect trapped bodies of different rigidity and thus trapping processes occurring at different speeds, the measured values are sampled and evaluated in equidistant time steps of, for example, one millisecond, while the time window having a width of 100 ms is selected ($t_M-t_R=100$ ms). This allows the reliable detection of trapping processes having a duration of 100 ms, with the threshold value or limit value for detecting a trapping situation being set, for example, at 60N. Typical trapping situations reveal force increase rates of approx. 1 N/ms and frictional forces $F_R$ in the order of magnitude of 50 ... 100N. In this case, the limit value would be reached 60 ms after the trapping begins and the drive would be switched off or reversed at $F_K$=60N.

To suppress sporadic measurement errors or short-time changes of the friction characteristic of the drive with a large amplitude, a weighted mean value from at least two trapping forces $F_K$ determined by way of equation (10) or (11) is used for the limit value comparison. With respect to equation (11), a weighted mean force value can be formed by weighted mean values of the current difference values $I(t_M)-I(t_R)$.

We claim:

1. Method for monitoring the opening and closing process in a system having at least one component (3) moved by electric motor, comprising the process steps:

during the movement of the components (3), all operating parameters of the motor (1) are captured continuously at time-equidistant measuring moments, the energy balance developing during the movement is formed with the aid of the captured operating parameters of the motor (1), the total force ($F_S$) resulting from the movement is determined from the energy balance and the design parameters of motor (1) and gear 2, the trapping force ($F_K$) is determined from the total force ($F_S$) at each measuring moment ($t_M$) with the aid of a time window whose window width is selected as time difference between the respective measuring moment ($t_M$) and a respective reference moment ($t_R$) such that, at least at one reference moment ($t_R$), a trapping does not yet occur ($F_K$=0), the course of the trapping force ($F_K$) as a function of time is evaluated and a trapping situation is detected when predetermined limit values or threshold values are exceeded, specific reactions are initiated when a trapping situation is recognized.

2. Method according to claim 1, characterized in that, during the determination of the trapping force ($F_K$), a weighted mean value is formed from at least two trapping forces ($F_K(t_M)$) which were determined at different measuring moments ($t_M$).

3. Method according to claim 2, characterized in that, from the operating parameters of the motor (1), only the value of the motor current ($I(t_R)$) is taken into account to determine the reference quantity prevailing at the reference moment ($t_R$).

4. Method according to claim 2, characterized in that the weighted mean values of at least two current difference values ($I(t_M)-I(t_R)$) are used to form the weighted mean value of the trapping force ($F_K$).

5. Method accordint to claim 3, characterized in that the weighted mean values of at least two current difference values ($I(t_M)-I(t_R)$) are used to form the weighted mean value of the trapping force ($F_K$).

* * * * *